Dec. 7, 1948.　　　V. O. BEAM ET AL　　　2,455,351
FIRE DETECTING APPARATUS
Filed Jan. 25, 1943
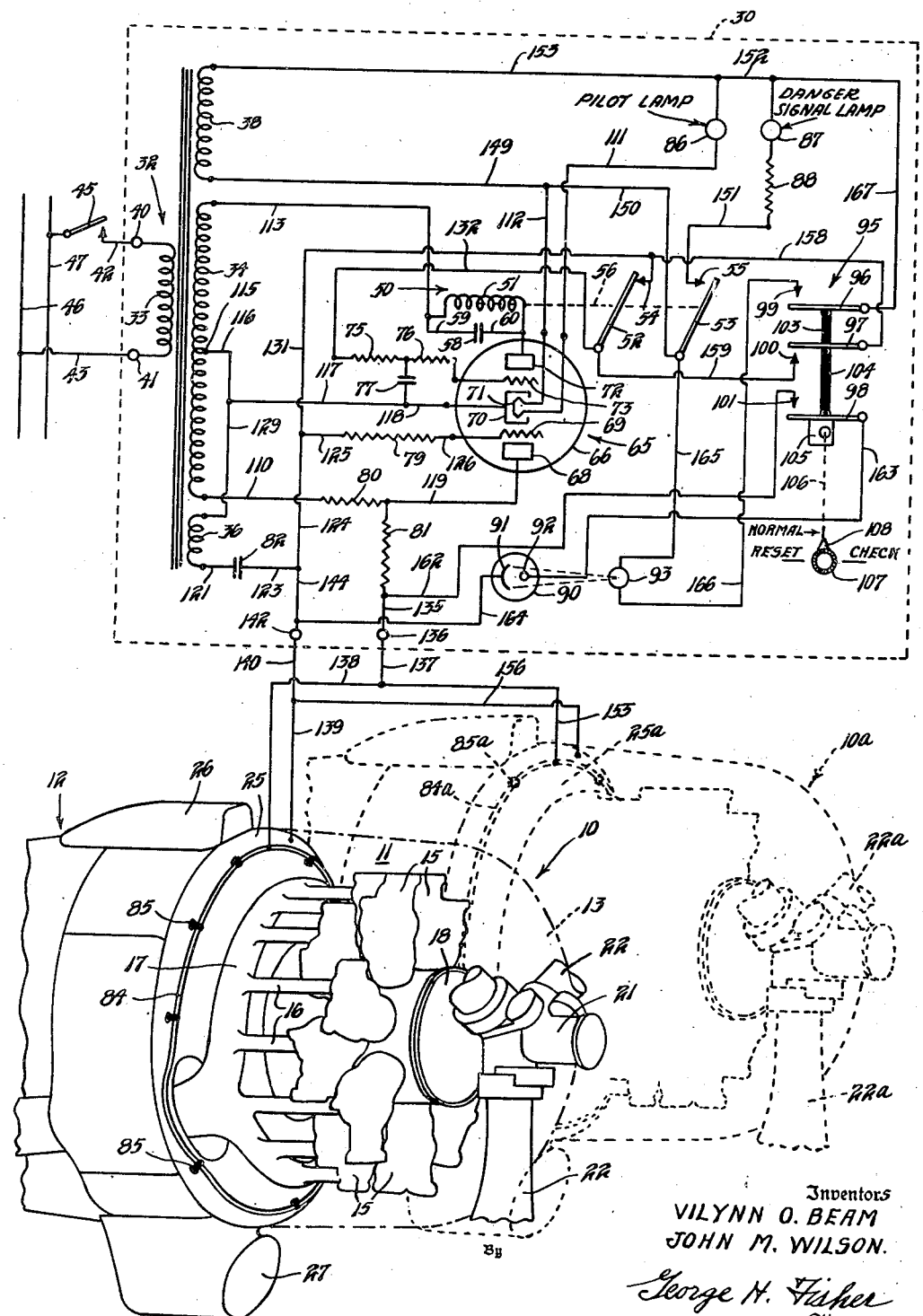
Inventors
VILYNN O. BEAM
JOHN M. WILSON
By George H. Fisher
Attorney Patented Dec. 7, 1948

2,455,351

UNITED STATES PATENT OFFICE 2,455,351

FIRE DETECTING APPARATUS

Vilynn O. Beam and John M. Wilson, Minneapolis, Minn., assignors to Minneapolis-Honeywell Regulator Company, Minneapolis, Minn., a corporation of Delaware Application January 25, 1943, Serial No. 473,514

12 Claims. (Cl. 177—355)

The present invention is concerned with fire detecting apparatus and more particularly such apparatus of the type depending for its operation upon current flow between two spaced electrodes bridged by a flame.

It has been proposed to employ for the detection of fires within enclosures, a pair of spaced electrodes with a potential applied between them and means responsive to the conductivity between the two electrodes so that upon existence of a flame bridging the two electrodes, some indicator means is brought into operation to indicate the presence of a flame. One of the defects of such detectors has been that the apparatus responsive to the conductivity between the two electrodes is not capable of distinguishing between a condition in which a flame bridges the electrodes and one in which the electrodes are short circuited by engagement with each other or by water between them. For example, in a mobile device such as an aircraft, it may be desirable to detect fires in compartments where rain is apt to enter during a rain storm. If the means responding to the conductivity between the electrodes is unable to distinguish between this condition and that which exists when a flame bridges the electrodes, it is obvious that a false indication of flame will result. This, of course, is highly undesirable, particularly in aircraft. Another disadvantage of prior flame detecting arrangements for enclosures has been that there has been no means for quickly checking the operation of the flame detecting system. This again is particularly important in the case of aircraft where the pilot may desire to check the operation of the system while in flight.

It is an object of the present invention to provide a flame indicating system for an enclosure in which provision is made for distinguishing between a flame condition and a condition arising from a short circuit, no matter how it is caused.

A further object of the present invention is to provide a fire detecting arrangement for an enclosure in which an indicating means is operated in accordance with the presence or absence of a rectifying impedance such as a flame in a gap in the circuit connections.

A still further object of the present invention is to provide such a fire detecting apparatus in which provision is made for checking the operation of the apparatus by connecting across the gap an element whose impedance characteristics simulate that of a flame.

A still further object of the invention is to provide a fire detection apparatus in which the apparatus is dependent upon the rectifying characteristic of a flame bridging a gap in the circuit connections and in which provision is made for connecting across a gap an illuminated photoelectric cell in order to check the operation of the apparatus.

A still further object of the invention is to provide means for determining conveniently whether the apparatus is in operation.

A still further object of the invention is to provide means for insuring that once a flame does occur, the indicating means will remain in the alarm position.

Other objects of the invention will be apparent from a consideration of the accompanying specification, claims, and drawing, in which the single figure is a schematic view of our fire detection apparatus employed in connection with a plurality of airplane engines.

The numeral 10 is employed to designate generally a portion of a nacelle unit of an airplane. A second nacelle unit is shown in dotted lines and is indicated by the reference numeral 10a. This nacelle unit generally comprises an engine compartment 11 and an accessory compartment 12. The engine compartment 11 normally is enclosed by a cowl 13 which is shown in dotted lines in the drawing. Located within the engine compartment 11 is an airplane engine of conventional type. This engine comprises a number of cylinders 15 disposed radially. Communicating with the cylinders 15 are exhaust pipes 16 which connect with a common exhaust manifold 17. The reference numeral 18 indicates the forward nose portion of the engine and extending through this nose portion is a propeller shaft to which is secured a propeller hub 21. The propeller hub 21 supports a plurality of propeller blades 22. The rearward portion of the engine compartment terminates in a fire wall 25 which separates the engine compartment 11 from the accessory compartment 12. The accessory compartment 12 houses various apparatus associated with the engine such as the carburetor and oil cooler. Secured to the upper portion of the accessory compartment 12 is the carburetor air intake 26 and secured to the lower forward portion of accessory compartment 12 is the oil cooler shroud 27.

The structure of the nacelle unit 10a is identical to that of unit 10 and so has not been described again. In this nacelle unit, the fire wall has been designated by the reference numeral 25a.

It is highly desirable to detect the presence of any fire in the engine compartment. Many of the fires originate in the compartment and due to the draft through it, the flames are projected backwards the rear portions of the airplane. Our apparatus is particularly designed for the detection of such engine fires or any other fires occurring in aircraft.

The fire detection apparatus is shown as located within a housing 30 which housing is secured to and forms a part of the control panel. The apparatus comprises a step-up, step-down transformer 32. This transformer has a primary winding 33, a high voltage secondary winding 34, and low voltage secondary windings 36 and 38. The line voltage primary winding 33 is connected through terminals 40 and 41, conductors 42 and 43, and a switch 45 to line wires 46 and 47 leading to any suitable source of power (not shown). The switch 45 constitutes a main switch and is closed whenever it is desired to have the fire detecting apparatus placed in operation.

A relay 50 is provided for controlling the energization of certain alarm apparatus to be referred to later. This relay comprises a relay coil 51 and a pair of switch blades 52 and 53 which are adapted to cooperate with contacts 54 and 55. Switch blade 52 is biased into engagement with contact 54 and switch blade 53 is biased out of engagement with contact 55. The switch blades 52 and 53 are connected to an armature 56 associated with relay winding 51. Upon energization of the relay winding 51, switch blades 52 and 53 are moved to the left so that switch blade 52 is moved out of engagement with contact 54 and switch blade 53 into engagement with contact 55. A condenser 58 is connected by conductors 59 and 60 in parallel with relay coil 51. The condenser 58 acts to smooth out any pulsations in the current flowing through relay coil 51.

The energization of the relay 50 is controlled by an electronic discharge amplifier 65. This amplifier comprises a conventional envelope 66 within which are housed two triodes. The first triode includes an anode 68, a grid 69, and a double cathode 70. The second triode consists of an anode 72, a grid 73, and the cathode 70. Associated with the cathode 70 are a pair of series connected cathode heater elements 71.

The potential applied to grid 73 is filtered by a filter network consisting of resistors 75 and 76 and a condenser 77. The numerals 79 and 80 indicate protective resistors and the numeral 81 a resistor which functions both as a protective resistance and to desensitize the system under certain conditions. The numeral 82 indicates a condenser which determines the potential applied to grid 73. Associated with and forming a part of the fire detecting apparatus is a circular electrode 84 secured to the fire wall 25 by insulators 85 which insulators serve to space the electrode 84 from the fire wall.

The numeral 86 designates a pilot lamp and the numeral 87 a danger signal lamp. A ballast resistance 88 is connected in series with the signal lamp 87.

A photoelectric cell 90 is provided for checking purposes. This cell comprises a cathode 91 and an anode 92. The photoelectric cell is adapted to be exposed to the illumination of an incandescent lamp 93.

A manual switch assembly is generally designated by the reference numeral 95. This assembly comprises three switch blades 96, 97, and 98 which cooperate with contacts 99, 100, and 101 respectively. The switch blades 96, 97, and 98 are connected together by links 103 and 104 of non-conducting material. Cooperating with switch blade 98 to determine the positions of all three switch blades is a cam member 105. This cam member is of a square cross section but is journaled eccentrically so that the different faces of the cam are variably spaced from the center. An operating shaft 106 is secured to cam 105. A knob 107 is secured to the outer end of the shaft 106 and is provided with a pointer 108 which corresponds with indicia on the control panel. While the shaft 106 is shown schematically as lying within the plane of the paper, it is to be understood that shaft 106 normally extends at right angles to the plane of paper. The switch is shown in the position which it assumes normally, this position bing designated in the drawing by the legend "Normal." In this position, all three switch blades 96, 97, and 98 are separated from their associated contacts. Upon movement of the knob 107 in a clockwise direction until the pointer 108 is opposite the legend "Check," the switch blades are moved to their uppermost position in which switch blades 96 and 98 are in engagement with contacts 99 and 101. If, on the other hand, the knob 107 is rotated to the left until the pointer 108 is opposite the legend "Reset," the switch blades 96, 97, and 98 assume their lowermost position in which switch blade 97 is in engagement with contact 100.

While the various elements of the system described so far may have a wide range of values, in one particular embodiment of the invention it was found desirable to employ a transformer having secondary windings of such voltages that the winding 36 had an output voltage of 24 volts, the winding 38 had an output voltage of 28 volts, and each half of the winding 34 an output voltage of 300 volts. In the same embodiment of the invention a 14N7 type tube was employed. The resistor 75 had a value of 1 megohm, the resistor 76, 2 megohms, the resistor 80, a value of 10,000 ohms, and resistor 81 a value of 6 megohms. Condensers 77 and 82 were each .02 microfarad condensers. The smoothing condenser 58 had a value of .5 microfarad. It is to be understood, as noted above, that these values are purely illustrative of those employed in one embodiment of the invention and that the invention is not in any way limited to the use of elements of these particular values.

*Operation*

The apparatus is shown with the main switch 45 in open position so that no power whatsoever is supplied to the apparatus. Let it be assumed that switch 45 is closed so that primary 33 is energized. When this happens, an energizing circuit is established to pilot light 86 and cathode heater 71 as follows: from the lower terminal of secondary 38 through conductors 149 and 112, heater filaments 71, conductor 111, pilot light 86, and conductor 153 back to the upper terminal of secondary 38. The establishment of this circuit causes energization of the pilot light 86 so as to indicate to the operator of the aircraft that the apparatus has been placed into operation. At the same time, the energization of heater elements 71 causes the amplifier 65 to be placed in condition where it can immediately respond to the presence of a flame.

The energization of primary 33 also causes power to be supplied to the electronic amplifier through secondary 34. The upper end of secondary 34 is connected through conductor 113 and relay winding 51 to anode 72. The center tap 115 of winding 34 is connected through conductors 116, 117, and 118 to the cathode 70. The lower terminal of secondary 34 is connected through conductor 110, resistor 80, and conductor 119 to the anode 68. Despite the fact that power is applied to the amplifier 65, the relay 50 is not energized in the absence of flame because of the biasing voltage applied to grid 73. This biasing voltage is applied through condenser 82. When power is applied to primary 33, the following charging circuit for condenser 82 is energized: from the lower terminal of secondary 36 through conductor 121, condenser 82, conductors 123, 124, and 125, resistor 79, conductor 126, grid 69, cathode 70, and conductors 118, 117, and 129 to the upper terminal of secondary 36. Due to the rectifying action of grid 69 and cathode 70, current can only flow through this circuit in the direction traced. As a result, the tendency of this circuit is to cause condenser 82 to have impressed across it a voltage such that the right hand end of the condenser is negative and the left hand end positive. This tendency of the condenser 82 to become charged in this manner is increased by a further circuit including the grid 73 and cathode 70 as follows: from the lower terminal of secondary 36 through conductor 121, condenser 82, conductors 123, 124, 131, contact 54, switch blade 52, conductor 132, resistors 75 and 76, grid 73, cathode 70, and conductors 118, 117, and 129, to the other terminal of secondary 36. The current flow through this last traced circuit, though less than that through the first traced circuit, further aids in the charging of condenser 82 in such a manner that the left hand terminal is positive and the right hand terminal negative. It is to be noted that right hand terminal of condenser 82 is connected through conductors 123, 124, 131, contact 54, switch blade 52, conductor 132, and resistors 75 and 76 with the grid 73. The left hand terminal of condenser 82 is, on the other hand, connected through conductor 121, secondary winding 36 and conductors 129, 117, and 118 with cathode 70. Thus, the tendency of a charge on condenser 82 which is of such polarity that the right hand terminal of condenser 82 is negative with respect to the left hand terminal, is to impress upon grid 73 a direct current potential negative with respect to the potential of cathode 70. It is also to be noted that the potential of the lower end of winding 36 with respect to the cathode is 180° displaced in phase from that of the connection 113 to the anode 72. Thus, the alternating voltage between cathode 70 and grid 73 by reason of winding 36 aids the effect of a charge on condenser 82 in biasing grid 73 negatively with respect to cathode 70. As a result of the combined effects of the alternating voltage of winding 36 and the direct current voltage resulting from the charge across condenser 82, the grid 73 is biased negatively below the cut-off point of amplifier 65 or at least sufficiently close to the cut-off point that the current flow through winding 51 is inadequate to energize the relay effectively.

If at any time a flame occurs in the engine compartment, this flame will be propelled towards the rear with considerable violence due to the motion of the aircraft through the air. Consequently, this flame will bridge the gap between the engine and electrode 84. As a result, a circuit will be established through condenser 82 as follows: from the lower terminal of secondary 34 through conductor 110, resistors 80 and 81, conductor 135, terminal 136, conductors 137 and 138, flame electrode 84, an element of the airplane engine which is grounded such as exhaust manifold 17, conductors 139 and 140, terminal 142, conductors 144 and 123, condenser 82, conductor 121, secondary 36, and conductors 129 and 116 to the center tap 115 of secondary 34. It will be noted that this circuit includes in series the condenser 82, the gap between the electrode 84 and the airplane engine, the lower half of secondary 34, and secondary 36. Secondary 36 is acting in opposition, however, to the lower portion of secondary 34. The voltage of secondary 36 is relatively small as compared with the voltage of the lower half of secondary 34 as will be evident from the typical values given above for these elements. Thus, in the case mentioned, the secondary 36 has a voltage of 24 volts while the lower half of secondary 34 has a voltage of 300. As a result, a voltage of 276 volts is applied between the electrode and the grounded engine. The current flowing between the electrode and the engine in the direction in which the circuit was traced above will tend to cause condenser 82 to become charged oppositely to that in which it was charged by the rectifying action of grids 69 and 73. In other words, the tendency of the current flow in the direction traced will be to cause the right hand terminal of condenser 82 to become positive with respect to the left hand terminal. This positive charge tends to raise the potential of grid 73 with respect to that of cathode 70 and overcome the biasing effect of winding 36. While current can flow in either direction through the circuit last traced, the current flow is greater in the direction traced. It will be noted that this direction is one which traverses the flame between the electrode and the exhaust manifold 17 in the direction opposite to the direction of propagation. It has been found that the conductivity of a burner flame is much greater in the direction opposite to the direction of propagation than in the direction of propagation of the flame. It is true that in the opposite half cycle, a circuit is established between the grounded fire wall 25 and the electrode 84 in the direction opposite to the direction of propagation of the flame and through the circuit in the direction opposite to that just traced. However, the operation obtained in actual tests has indicated that the current flow is greater in the direction traced than in the opposite direction. It is believed that this is due to the fact that the rectifying property of a flame is more pronounced at a point close to the origin than at the tip of the flame. Apparently, the area adjacent the outer extremities of the flame exhibits the rectifying properties to only a slight extent. Thus, the gap between electrode 84 and fire wall 25 might be considered as being bridged by a resistance while that between electrode 84 and the exhaust manifold 17 or the cylinders 15 by a resistance connected in series with a rectifier. The net result is that the current flow is greater through the circuit in the direction traced than in the opposite direction so that a direct current component is impressed across the condenser 82, this component being of such polarity, as previously explained, as to overcome the negative bias on the grid and to render the tube conductive. Upon this happening, a circuit is established through relay coil 51 as follows: From the upper terminal of secondary 34 through conductor 113, relay coil 51, anode 72, cathode 70, and conductors 118, 117, and 116 to the center tap 115. The energization of relay coil 51 as a result of the establishment of this circuit causes switch blades 52 and 53 to move to the left, switch blade 52 moving out of engagement with contact 54 and switch blade 53 moving into engagement with contact 55. It is to be noted that the connection traced between the right hand end of condenser 82 and grid 73 included the switch blade 52 and the contact 54. As soon as switch blade 52 moves out of engagement with contact 54, this circuit is interrupted with the result that the condenser 82 no longer influences the potential of grid 73. The grid 73 accordingly assumes the potential of cathode 70 by reason of its connection to the cathode through condenser 77. When the grid is at cathode potential, the triode including anode 72 and cathode 70 is conductive. Thus, the relay 51 remains energized regardless of whether the flame may disappear temporarily. The value of this is that at the instant when the fire first occurs, it may be fluttering in character and if so, the relay 50 might pull in and drop out periodically. Since the function of relay 51 is to control an alarm device and since it is desired that this alarm device sound continuously as soon as a fire has been detected, it is desirable that the relay 51 remain energized continuously following the occurrence of a flame no matter how temporarily.

The movement of switch blade 53 into engagement with contact 55 results in the establishment of the following circuit through the danger signal lamp 87: from the lower terminal of secondary 38 through conductors 149 and 150, switch blade 53, contact 55, conductor 151, resistor 88, signal light 87, and conductors 152 and 153 back to the upper terminal of secondary 38. The lamp 87 is located on the instrument panel and serves to indicate to the pilot that a fire has occurred in the airplane engine. The pilot can then take steps to extinguish the fire by the operation of some fire extinguishing system. If desired, the relay 51 can be employed to automatically bring into operation fire extinguishing apparatus.

In the flame circuit traced through condenser 82 the circuit was traced between electrode 84 and the exhaust manifold 17. It is to be understood that there is an electrode corresponding to electrode 84 provided for each of the airplane engines. It is also desirable to locate similar electrodes at other places in the airplane such as the accessory compartment and the oil cooler. An electrode 84a is indicated in connection with the nacelle unit 10a. It will be obvious that if a flame occurs in the nacelle unit 10a, a circuit will be established through condenser 82 similar to the flame circuit previously traced except that the current flowing through conductor 137 to conductor 140 will pass instead through conductor 155, electrode 84a, the gap between this electrode and the exhaust manifold 17a, and conductor 156. In other words, the various flame gaps are all connected in parallel across the gap between terminals 136 and 142. The terminal 136 is the flame electrode terminal and the terminal 142 the ground terminal.

After a flame has been indicated and taken care of, it is necessary to reset the apparatus before it is again ready to function. It will be recalled that the relay 51 remains permanently energized so as to maintain switch blade 52 out of engagement with contact 54. Before the apparatus is again ready for operation, it is necessary that this gap in the connection between condenser 82 and grid 73 be bridged sufficiently long to permit relay 51 to drop out. One of the functions of the switching mechanism 95 is to accomplish this. As previously pointed out, upon rotation of knob 107 to the position indicated by the legend "Reset," switch blade 97 is moved into engagement with contact 100. As soon as this engagement of switch blade 97 and contact 100 occurs, a circuit is established between the right hand terminal of condenser 82 and grid 73 as follows: from the right hand terminal of condenser 82 through conductors 123, 124, 131, and 158, switch blade 97, contact 100, conductors 159 and 132, and resistors 75 and 76 to grid 73. Assuming the fire to be extinguished, the establishment of this connection again establishes the conditions previously outlined for biasing grid 73 negatively. As a result, the relay 51 drops out causing the re-engagement of switch blade 52 and contact 54. The electronically controlled apparatus is again in the position shown and the knob 107 can be returned to the position shown, which is the normal position.

A very important feature of the present invention is that the operation of the apparatus depends upon the rectifying properties of the flame. Because of this, the accidental short circuiting of the electrodes does not falsely indicate a flame. Thus, as the electrode 84 comes in contact with the engine which constitutes a second electrode, the apparatus will not falsely indicate the presence of a fire. As long as the impedance between the electrode and the grounded engine is purely a resistance impedance, the current flowing through condenser 82 as a result of the circuit through electrode 84 is purely an alternating current. Consequently, the voltage across condenser 82 is alternating. This voltage furthermore, is 180° out of phase with the anode voltage so that the tendency of the voltage is to drive grid 73 to a point even more negative than that to which it is biased. In this connection, it is to be noted that the tendency of any short circuit condition is to reduce the impedance of the connection between the lower terminal of secondary 34 and grid 73 through the following circuit: from the lower terminal of secondary 34 through conductor 110, resistors 80 and 81, conductor 135, terminal 136, conductors 137 and 138, electrode 84, the grounded engine, conductors 139 and 140, terminal 142, conductors 144, 124, and 131, contact 54, switch blade 52, conductor 132, and resistors 75 and 76. As long as the flame is present, the impedance of the connection is relatively high. If the impedance of the flame gap is lowered, however, the resistance of this connection becomes constantly less so that the grid tends to assume more nearly the potential of the lower end of secondary 34. The lower end of the secondary 34, however, is at a potential 300 volts below the potential of cathode 70 during the half cycle in which anode 72 is positive with respect to cathode 70. As a result, the effect of this connection is to bias the grid 73 even more negative whenever the flame gap is not bridged by a rectifying impedance.

The anode 68 functions to provide a corrective phase shifting action. Due to the presence of condenser 82, there tends to be a phase shifting action which shifts the phase of the voltage applied to the grid 73 as a result of the connection between the lower end of secondary 34 and the grid 73, just traced above. By providing anode 68, this phase shifting effect is corrected. The theory of operation of this portion of the apparatus is more fully explained in the co-pending application of Vilynn O. Beam, Serial No. 450,613, filed July 11, 1942. Reference is made to that application for a fuller understanding of the phase shifting effect of the anode 68.

A very important result of the fact that the system is not affected by the connection of a non-rectifying impedance across a flame gap is that it will not falsely indicate a flame when the flame gap is bridged by water. Obviously, the effect of water between the flame electrode and the engine is that of a non-rectifying impedance so that the action will be that previously described when a non-rectifying impedance is connected across a flame gap. It has been found, however, that there is some tendency when the gap is bridged by a fine water spray for the system to falsely indicate a flame unless a resistor such as resistor 81 is incorporated. The reason for this is believed to be that the water spray causes a very high frequency bridging of the flame gap. This high frequency bridging of the flame gap introduces some sort of effect which causes the apparatus to operate in a different manner. One possible explanation is that the resulting high frequency current causes a pronounced phase shifting which cannot be corrected for without unduly complicating the apparatus. It has been found, however, that by the incorporation of a resistor 81 of sufficient magnitude that this tendency of the relay to falsely pull in upon the presence of a fine water spray is eliminated. This is extremely important since an airplane traveling through a rain storm will be subjected to such a fine water spray in the engine compartment. It would obviously be undesirable to have an indication of flame every time that this occurred. With our apparatus, however, this is entirely prevented.

Another advantage of the fact that the operation of the apparatus depends upon the rectification characteristics of the impedance between the flame gap and the engine is that a very minute current through the flame is required for operating the apparatus. Furthermore, the spacing of the electrode 84 from the engine is not critical so long as the electrode 84 is so located that the current flowing from it to the engine is in the direction opposite to the direction of propagation of the flame and close to the source of the flame. In other words, the operation of the apparatus is not directly dependent upon the value of the impedance between the electrode and ground but merely requires that the rectifying tendency be present to an appreciable extent. Consequently, it is possible to detect the presence of a flame at any place between a fixed electrode and an irregularly shaped object despite the fact that the spaces between the electrode and irregularly shaped object will vary considerably along the path of the electrode.

It is desirable that a fire detecting system can be readily checked. This is extremely important in the case of a fire detecting system for an aircraft. In many prior systems the checking of the system could not be accomplished while the airplane was in actual flight. Our apparatus provides for such a check.

In checking the operation of the apparatus, it is only necessary for the operator to turn knob 107 to the position indicated by the legend "Check." When this is done, switch blade 96 is moved into engagement with contact 99 and switch blade 98 is moved into engagement with contact 101. The movement of switch blade 98 into engagement with contact 101 connects the photoelectric cell 90 between the flame electrode 136 and the ground terminal 142 as follows: from flame electrode terminal 136 through conductors 135 and 162, contact 101, switch blade 98, conductor 163, anode 92 and cathode 91 of photoelectric cell 90, and conductor 164 to the ground terminal 142.

The engagement of switch blade 96 with contact 99 establishes a circuit to the lamp 93 as follows: from the lower terminal of secondary 38 through conductors 149, 150 and 165, lamp 93, conductor 166, contact 99, switch blade 96, and conductors 167, 152, and 153 back to the upper terminal of secondary 38. The establishment of this circuit causes lamp 93 to be energized with the result that it illuminates photoelectric cell 90. Such a photoelectric cell, upon being subjected to a source of light, becomes conductive to current flowing from the anode to the cathode. In other words, such a photoelectric cell when illuminated acts as a rectifying impedance. It is to be noted that in the connections of the photoelectric cell 90 between terminals 136 and 142 traced above, the anode 92 is connected to terminal 136 and the cathode 91 to terminal 142. Thus, the current flow is from terminal 136 to 142 which is the same direction in which it was traced in tracing the charging circuit through the flame. The effect of the connection of the illuminated photoelectric cell 90 across the flame gap is thus to cause condenser 82 to be charged in the same manner as happens when a flame is present. If the apparatus is functioning properly, relay 50 will pull in to energize the alarm 87 and indicate to the pilot that the fire detection apparatus is functioning properly. The operator then moves the knob back to the "Reset" position to cause deenergization of relay 50, and then back to the normal position. It will be seen from the above that the proper operation of the apparatus is readily checked by a very simple operation which can be performed at any time. Where the relay 50 is employed to initiate the operation of fire extinguishing apparatus, it is desirable that the switching mechanism 95 be provided with a further switch in series with the control for the fire extinguishing apparatus and which is normally closed but which is opened upon the switch being moved to the "Check" position. It obviously would be desirable to have the fire extinguishing apparatus brought into operation during a checking operation.

It will be seen that we have provided a fire detecting apparatus which offers the maximum safety, which guards against any false indications of flame, and which can be readily checked at any time.

While we have shown a specific embodiment of our invention, it is to be understood that this is only for purposes of illustration and that the invention is to be limited solely by the scope of the appended claims.

We claim as our invention:

1. In combination with an (enclosure) normally free from flame, a fire detection system comprising two spaced electrodes located within said enclosure, means for impressing an alternating potential difference between said electrodes, a condenser, mean comprising a circuit including said condenser in series with said electrodes for charging said condenser by the rectified current flowing between said electrodes when said electrodes are bridged by a flame, and indicating means controlled by said condenser and effective to indicate a flame only when said condenser is so charged.

2. In a fire detection system for an enclosure, an electrode adapted to be located within said enclosure in spaced relation to an element acting as a second electrode, means for impressing a potential difference between said electrodes, indicating means responsive solely to the presence between said electrodes of a rectifying impedance such as a flame to indicate a fire, and testing means for said fire detection system comprising means for connecting a photoelectric cell across the gap between said electrodes and illuminating the same.

3. In an electronic flame detector; a relay means; a space discharge amplifier having an anode, a cathode, and a control element; a source of alternating power connected to said amplifier; means including said amplifier controlling the energization of said relay means and operative to cause either energization or effective deenergization of said relay means depending upon within which of two ranges of values said control element potential is maintained; a connection between said control element and a point on said source such that the connection tends to maintain said control element at an alternating potential within one of said two ranges of values; said connection including a gap; means associated with said connection and effective when said gap is bridged by a flame to maintain said control element at a potential within the other of said two ranges of values by reason of the rectifying properties of said flame; and testing means for said flame detector comprising a photoelectric cell, means for connecting the same across said gap, and means for illuminating said photoelectric cell.

4. In an electronic fire detector for an enclosure normally free of flame; an indicating means; a space discharge amplifier having an anode, a cathode, and a control element; a source of power connected to said amplifier; said amplifier controlling the energization of said indicating means and operative to cause energization of said indicating means when said control element is maintained at a potential above a predetermined value negative with respect to the potential of the cathode; biasing means for maintaining the potential of said control electrode below said predetermined value; means operative upon the presence of a flame within said enclosure to raise the potential of said control element sufficiently to cause energization of said indicating means; and means operative upon energization of said indicating means to render said biasing means ineffective to affect the potential of the control element so that said indicating means remains energized even though the flame is unsteady.

5. In an electronic fire detector for an enclosure normally free of flame; an indicating means; a space discharge amplifier having an anode, a cathode, and a control element; a source of alternating power connected to said amplifier; said amplifier controlling the energization of said indicating means and operative to cause energization of said indicating means when said control element is maintained at a potential above a predetermined value negative with respect to the potential of the cathode; biasing means for maintaining the potential of said control element below said predetermined value; a connection between said biasing means and said control element; means operative upon the presence of a flame within said enclosure to raise the potential of said control element sufficiently to cause energization of said indicating means; switching means operative upon energization of said indicating means to interrupt said connection between said control element and said biasing means so that said indicating means remains energized even though the flame is unsteady; and a manually operated switch connected in parallel with said switching means and movable to a "reset" position in which it is effective to reestablish said connection to said biasing means.

6. In an electronic flame detector for an enclosure normally free of flame; a relay means; a space discharge amplifier having an anode, a cathode, and a control element; a source of power connected to said amplifier; said amplifier controlling the energization of said relay means and operative to cause either energization or effective deenergization of said relay means depending upon within which of two ranges of values said control element potential is maintained; biasing means for maintaining said control element at a potential within one of said two ranges of values; a pair of spaced electrodes adapted to be located in said enclosure; means effective when the gap between said electrodes is bridged by a flame to cause said control element to assume a potential within the other of said two ranges of values by reason of the rectifying properties of said flame; said relay means being effective upon said control element potential assuming a value within said other of said two ranges of values to disconnect said biasing means from said control element so that the relay means remains in the same condition of energization following the detection of a flame despite subsequent fluctuation of the flame; an element having the same impedance characteristics as a flame; and manually operated switching means movable from a normal position to either a "checking" position in which said last named element is connected across the gap between said electrodes or a "reset" position in which the biasing means is connected with said control element independently of said relay means.

7. In an electronic flame detector; a pilot lamp; a danger signal lamp; a space discharge amplifier having an anode, a cathode, a cathode heater, and a control element; a source of power, connections between a portion of said source of power and said anode and cathode; further connections between a different portion of said source of power and said cathode heater; said last named connections including said pilot lamp in series with said cathode heater; a relay controlling the energization of said danger signal lamp; said amplifier controlling the energization of said relay and being effective to energize the same when the potential of said control electrode is above a predetermined value; a connection including a gap; means associated with said connection and effective when said gap is bridged by a flame to cause said control element to assume a potential above said predetermined value to cause energization of said relay and hence said signal lamp; and testing means for said flame detector comprising an element having similar impedance properties to a flame; and means for connecting said element across said gap.

8. In combination with an enclosure normally free from flame, a fire detection system therefor comprising two spaced electrodes located within said enclosure, means for impressing an alternating potential difference between said electrodes so that when said electrodes are bridged by a flame a current flows between said electrodes, said current having a unidirectional component of a predetermined polarity by reason of the rectifying properties of the flame, alarm means for warning of the presence of a flame, and means including a condenser connected to one of said electrodes for causing operation of said alarm means only when said condenser is charged with a voltage of a predetermined polarity so that said alarm means is not operated in the absence of flame by reason of said electrodes being bridged by a non-rectifying impedance such as water even though the value of such impedance is the same as the impedance of a flame.

9. In combination with an enclosure normally free from flame, a fire detection system therefor comprising two spaced electrodes located within said enclosure, means for impressing a potential difference of such character between said electrodes that when said electrodes are bridged by a flame a current flows between said electrodes having a unidirectional component of a predetermined polarity by reason of the rectifying properties of the flame, indicating means for indicating the presence of a flame, means including a device responsive to such a unidirectional component for causing operation of said indicating means only when said device responds to such a unidirectional component so that said indicating means is not operated in the absence of flame by reason of said electrodes being bridged by a non-rectifying impedance such as water even though the value of such impedance is the same as the impedance of a flame, and means for connecting an electronic rectifier across said electrodes for testing purposes so as to simulate the presence of a flame and cause said indicating means to be operated as though a flame were present.

10. In a fire detection system for an enclosure, an electrode adapted to be located within said enclosure in spaced relation to an element acting as a second electrode, means for impressing a potential difference between said electrodes, indicating means responsive solely to the presence between said electrodes of a rectifying impedance such as a flame to indicate a fire, said indicating means including circuit means to prevent operation of said indicating means upon the presence of a symmetrically conductive impedance of any magnitude whatsoever between said electrodes, and means for causing a rectifier to be connected across the gap between said electrodes for checking purposes so as to simulate the presence of a flame and cause said indicating means to respond, if functioning properly, as though a flame were present.

11. In combination with an enclosure normally free from flame, a fire detection system therefor comprising two spaced electrodes located within said enclosure, means for impressing an alternating potential difference of such character between said electrodes that when said electrodes are bridged by a flame a current flows between said electrodes having a unidirectional component of a predetermined polarity by reason of the rectifying properties of the flame, alarm means for warning of the presence of a flame, an electrical reactor connected to said electrodes, and circuit means including said reactor for causing operation of said alarm means upon a flame bridging said electrodes and producing a sufficient unidirectional voltage across said reactor and for preventing operation of said alarm means when said electrodes are bridged by a non-rectifying impedance of any value.

12. In an electronic flame detector for an enclosure normally free from flame, a pair of spaced electrodes adapted to be located within said enclosure, means for impressing a potential difference between said electrodes so that when said electrodes are bridged by a flame a current flows between said electrodes, an indicating device for indicating the presence of a flame, means for controlling the operation of said indicating device including an electronic discharge device comprising an anode, a cathode, and a control element, biasing means for normally maintaining said control element at such a potential with respect to said cathode that said indicating device is not operated to indicate flame, means including connections to said control element and cathode and affected by current flow of even short duration between said electrodes as a result of a flame to cause said control element to assume a potential with respect to said cathode such as to cause said discharge device to effect operation of said indicating means, and means operative as an incident to the operation of said indicating means to cause said control element to assume a potential with respect to said cathode which will maintain said indicating means operative despite the subsequent termination of flame.

VILYNN O. BEAM.
JOHN M. WILSON.

REFERENCES CITED

The following references are of record in the file of this patent:

UNITED STATES PATENTS

| Number | Name | Date |
|---|---|---|
| 1,718,857 | Elliott | June 25, 1929 |
| 1,959,702 | Barker | May 22, 1934 |
| 2,112,736 | Cockrell | Mar. 29, 1938 |
| 2,127,977 | Lamb | Aug. 23, 1938 |
| 2,175,017 | Cockrell | Oct. 3, 1939 |
| 2,177,493 | Koulichkov | Oct. 24, 1939 |
| 2,225,700 | Laing | Dec. 24, 1940 |
| 2,238,892 | Fanger | Apr. 22, 1941 |
| 2,243,071 | Crago | May 27, 1941 |
| 2,260,977 | Jones | Oct. 28, 1941 |
| 2,297,821 | Whempner | Oct. 6, 1942 |
| 2,302,271 | Smith | Nov. 17, 1942 |
| 2,313,943 | Jones | Mar. 16, 1943 |
| 2,385,976 | Evans | Oct. 2, 1945 |